United States Patent [19]

Keesler

[11] Patent Number: 4,471,971
[45] Date of Patent: Sep. 18, 1984

[54] DISPLAY ISLAND MOVING MEANS
[76] Inventor: Patrick E. Keesler, 105 N. Richmond, Appleton, Wis. 54911
[21] Appl. No.: 366,366
[22] Filed: Apr. 7, 1982
[51] Int. Cl.³ .............................................. B60P 3/40
[52] U.S. Cl. ........................ 280/79.1 A; 280/47.13 R; 280/35
[58] Field of Search .............. 280/35, 79.1 R, 79.1 A, 280/33.99 R, 47.13 R

[56] References Cited

U.S. PATENT DOCUMENTS

| | | | |
|---|---|---|---|
| 175,259 | 3/1876 | Selman et al. | 280/35 |
| 234,336 | 12/1880 | Schenck | 280/35 |
| 234,836 | 11/1880 | Rorke | 280/35 |
| 1,283,166 | 10/1918 | Harper | 280/35 |
| 2,789,828 | 4/1957 | Gary | 280/35 |
| 4,014,560 | 3/1977 | Hughes | 280/79.1 R |

FOREIGN PATENT DOCUMENTS 634538  1/1962  Canada ........................... 280/79.1 R Primary Examiner—David M. Mitchell
Attorney, Agent, or Firm—Russell L. Johnson

[57] ABSTRACT

A display island moving means characterized by two long substantially horizontal plates which are supported a fraction of an inch above a floor by means of rollers such as casters and upon which the leveling feet or legs of a display island may be supported during the moving of the island from place to place. Each of the two longitudinal horizontal plates supports the multiple legs of one side of the display island and the two horizontal plates are joined to each other in assembly so that the plates are prevented from converging or diverging during movement of the display island.

1 Claim, 3 Drawing Figures

DISPLAY ISLAND MOVING MEANS

BACKGROUND OF THE INVENTION

The movement from place to place of large, sometimes heavy, sometimes irregularly shaped objects presents many problems which are frequently unique to the objects to be moved. Often, general utility movers such as hand trucks, dollies, lifts and the like will not satisfactorily serve as movers for such objects.

The moving of merchandise display islands such as those found in retail stores and the like presents one such rather unique set of problems. The display islands are variable in length and width but in general are considerably longer than they are wide. Often the display islands are not of rigid construction and are not even what would commonly be called of sturdy construction. The islands are conventionally supported above the floor by means of short legs or leveling feet or pads which permit the cleaning of the floor under the island. The weight of the island is borne by these legs or feet. These legs or feet are often the only structural members of the island capable of bearing the weight of the island.

It is present practice, when it is desired to move a display island, to remove the merchandise from the island, disassemble the island, reassemble the island in the new location, and to restock the island. The moving of display islands, while not uncommon is not an every day occurrence. Therefore, a specialized display island moving means must meet several situationally defined criteria. The moving means must permit the moving of the islands in the relatively restrictive confines of the aisles of stores and the like. The construction of the mover must be such that it will accommodate the range of sizes of the islands possessed by the user. The mover must be of sturdy and dependable construction while at the same time low enough in cost to provide an economic benefit to the user. Because the periods of use of the mover will be brief and it will be in storage the majority of the time the mover must be readily placed in and removed from storage and occupy as little space as is practical while in storage.

BRIEF DISCUSSION OF THE PRIOR ART

The prior art contains a vast number of specialty moving devices the overwhelming majority of which would have little or no practical application to solving the problems of moving display islands. The prior art does not contain a specialty moving device which will serve the same utilities as the device of this invention. Specifically, the prior art does not provide a means for safely supporting a long and large object by means of placing a multiplicity of the objects legs or feet upon a horizontal support structure which is very near to the floor surface, and a means for combining two or more of these horizontal support structures to form a movable platform upon which a display island may be moved without damage to the structure or contents of the display island or to the floor.

However, when the prior art is examined in view of the above background material and the following specifications, drawings, and claims, the art does contain speciality moving devices which have one or more elements in common with this invention. While none of these prior art devices would serve satisfactorily for the safe moving of display islands they are representative of the most relevant prior art known to the inventor.

U.S. Pat. No. 520,319 to Kynoch teaches an adjustable truck with means for supporting heavy bodies upon their legs or feet for the purpose of moving the heavy body.

U.S. Pat. No. 2,782,046 to Swain teaches the use of two lead support units which are joined to each other by an adjustable joining means to form a platform upon which a large article may be moved.

U.S. Pat. No. 4,220,347 to Huntington teaches the use of horizontal support members positioned very near the floor specifically for facilitating the movement of pianos and the like.

U.S. Pat. No. 3,533,640 to Fator teaches the use of multiple dollies or tracks having a relatively low spoort structure which may be placed under the ends of a large load to be moved.

U.S. Pat. No. 2,375,720 to Wood teaches the use of a chain to join two elements of an article handling apparatus.

U.S. Pat No. 3,918,733 to Macho teaches the use of multiple support means positioned relatively near the floor with provisions for supporting an appliance upon its legs or feet.

The prior art does not teach this invention nor provide a means which will satisfactorily serve the ends achieved by this invention. It is not reasonable to assume, that one skilled in the art, being in possession of the vast body of the prior art specialty moving devices, and without the handsight benefits of the disclosures contained herein, and being confronted with the problems of providing a means for moving display islands, would find it obvious to select from the prior art the elements that the prior art has in common with this invention and then to modify them and combine them to achieve this invention.

OBJECTS

It is therefore an object of this invention to provide a specialty moving means to be employed in moving display islands and other like objects which present similar problems in moving as those presented by display islands.

It is further an object of this invention to provide a display island moving means as described above wherein the moving means comprises two substantially identical members each member being supported by caster wheels and having a continuous horizontal longitudinal platform positioned a fraction of an inch above the floor and upon which a multiplicity of the legs or feet or supports, of a display island may be placed and supported for the purpose of moving the display island.

It is further an object of this invention to provide a display island moving means as described above wherein the members are joinable to each other by adjustable means to provide a display island moving unit which supports the display island a fraction of an inch above the floor and permits the safe moving of the island.

Other objects will become apparent from the specifications, claims, and drawings of this disclosure.

BRIEF DESCRIPTION OF THE INVENTION

In its simplest form the invention may be characterized as two long elements each having a longitudinal horizontal plate joined to a longitudinal vertical plate as for instance in a piece of conventional angle iron and the horizontal plate is supported a fraction of an inch above a floor by roller support means such as casters and the like. The support means being joined to the longitudinal plates at least at locations near the ends of the longitudinal plates so that each support means provides a rollers means lateral to each of the longitudinal edges of the horizontal plate. The two elements are adjustably joinable to each other to form a display island moving unit. In use the two long elements are place one on each side of the island. The legs or leveling feet or pads of the island are raised slightly above the floor and the horizontal plate is placed under them and moved in until the vertical plate engages a structural part of the island. After both the horizontal plates are in position and supporting the island the two long elements are joined to each other at or near their ends by means of a chain or other adjustable joining means. Engagement of the longitudinal vertical plate with structural members of the display island prevents the convergence of the two elements of the unit, while the chain or other adjustable joining means prevents divergence of the two elements of the unit. Friction between the support feet or pads and the horizontal plate serves to prevent longitudinal movement of the island relative to the moving unit. Eyebolts positioned near the ends of the two long elements serve as stops to prevent the island from sliding off the unit in the event the moving unit should suddenly engage an obstruction.

DETAILED DESCRIPTION OF THE INVENTION

In the figures like numbers refer to like objects.

Figure 1:
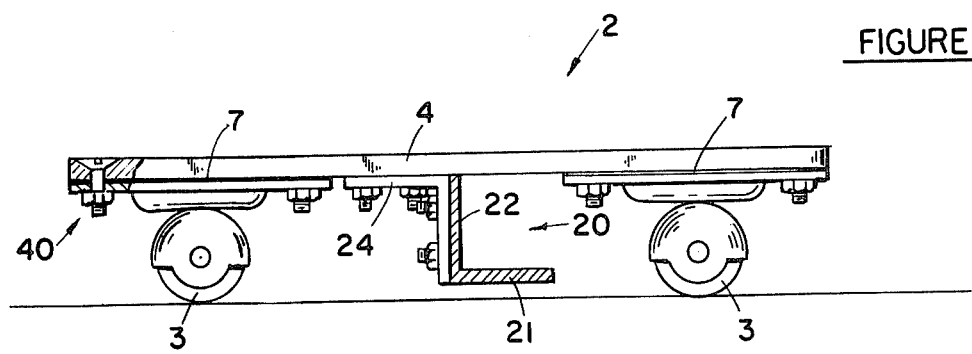
FIG. 1 is an elevational, partially sectioned view of a longitudinal element of the preferred embodiment of the invention.
Figure 2:
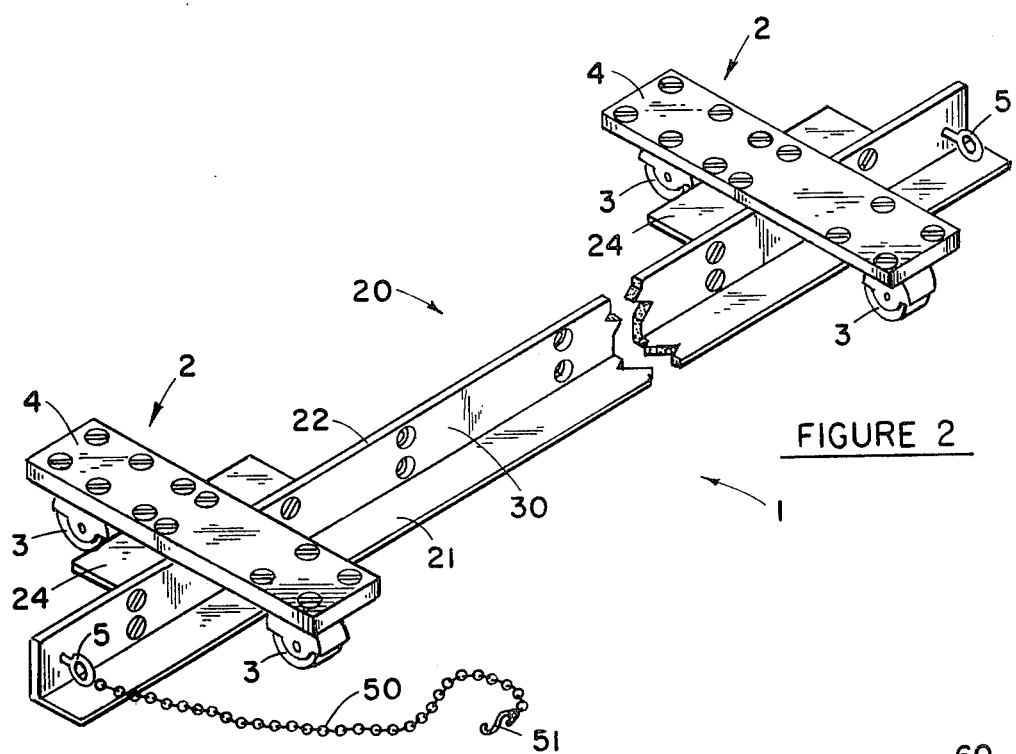
FIG. 2 is a pictorial view of the element of FIG. 1.
Figure 3:
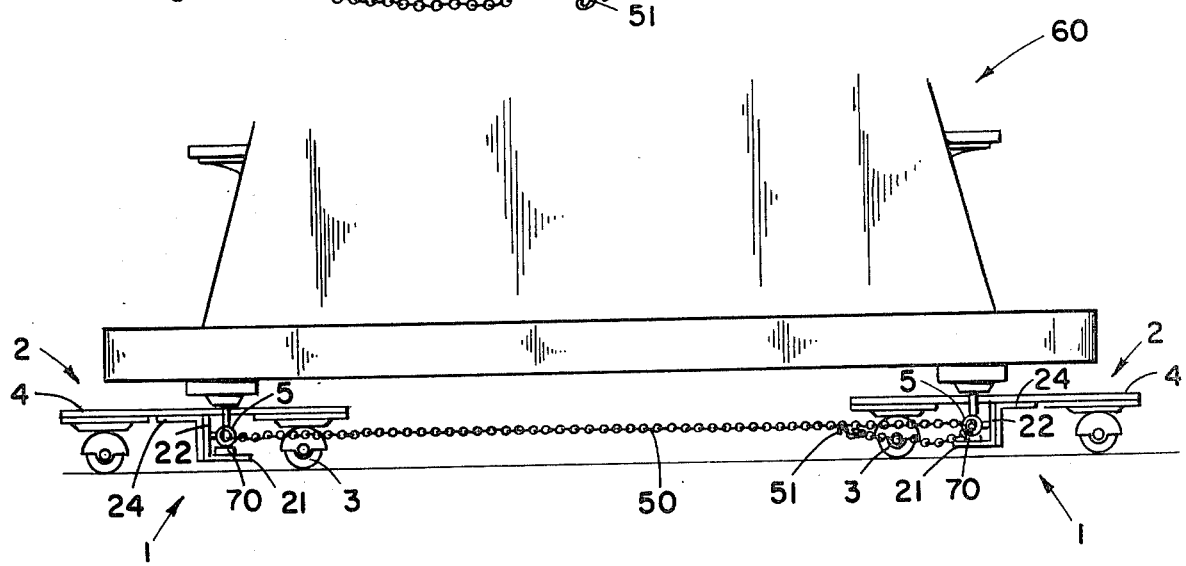
FIG. 3 is an elevational view of the two assembled elements as they would appear when employed to move a display island.

Referring now to FIGS. 1 through 3 which show the preferred embodiment of the moving means of this invention. Angle iron 20 has as a part thereof inward directed longitudinal horizontal plate 21 and upward directed vertical plate 22. Angle iron 20 is provided with support units 2 which may be positioned along the length of angle iron 20 such as location 30 by at least one support unit 2 is positioned near the ends of angle iron 20. Support beam 4 of support unit 2 has attached at its ends roller means 3 which are casters in the preferred embodiment. Beam 4 is joined to angle iron 20 by means of angle brace 24. The joining of the roller means 3, support beam 4, engle brace 24 and angle iron 20 may be by means of threaded fasteners such as illustrated by joining means 40 or it may be by welding, riveting or any other suitable means. In general, nuts and bolts will serve well and provide the device with an ease of assembly and disassembly which permits economical manufacture and shipping.

In the preferred embodiment chain 50 is the means for joining two longitudinal elements 1 to form a display island moving unit. Eyebolts 5 are secured near the end of angle iron 20. Chain 50 may be provided with s-hooks 51 at its ends as shown. In practice chain 50 is secured to eyebolt 5 of one longitudinal element 1 and after display island 60 is positioned upon horizontal plates 21 of two such longitudinal elements 1 chain 50 is passed through eyebolt 5 of opposite element 1 and doubled back upon itself and secured in position by means of s-hook 51. It has been found that the securement of one end of chain 50 to an eyebolt 5 of longitudinal element 1 serves to insure that chain 50 does not become separated from longitudinal elements 1 during storage and is therefore available and in the proper location when needed.

In use, two longitudinal elements 1 are positioned along each side of display island 60. Display island 60 is tilted slightly to permit the raising of leveling pads 70 of display island 60 a fraction of an inch above the floor. It has been found that display islands are sufficiently flexible to permit the raising of leveling pads 70 a fraction of an inch off the floor without sustaining damage. However, the height to which the leveling feet must be raised is desirably kept to a minimum. Therefore longitudinal horizontal plate 21 is supported as close to the floor as the irregularities of the floor will permit. Adjustment of the height that plate 21 is maintained above the floor may be had by adding or removing shims 7 between roller means 3 and support beam 4. Plate 21 moved under leveling pads 70 until vertical plate 22 engages a structural member of the island. The above procedure is then followed with the opposite element 1. Chains 50 are then secured as discussed above and shown in FIG. 3. The display island moving unit is now in place and display island 60 may safely and conveniently be moved.

When not in use, longitudinal elements 1 may be stored on racks or under a table, or bench, on a wall, or suspended from a ceiling.

The preferred embodiment of the invention is disclosed above. However, the scope of this invention should not be limited to the disclosed preferred embodiment. Functional equivalents of the elements of this invention will become readily apparent to one skilled in the art. For example, the lateral adjustable joining means of longitudinal elements 1 of the display island moving unit of this invention may take many functionally equivalent forms. The utility of chain 50 may be served by adjustable cables, rods, resilient springs, and the like. The utility of eyebolt 5 may be served by any suitable attachment means such as snap-hooks, loops, and even holes or notches formed in angle iron 20. It is apparent that the recitation of the functional equivalents of the components of this invention would greatly multiply the drawings and claims and cause the specifications to become prolix without adding significantly to the disclosure of the invention. It should therefore be clearly understood that the scope of this invention should not be limited to the embodiments disclosed but be limited only to the scope of the appended claims and all equivalents thereto which would would become apparent to one skilled in the art.

I claim:

1. A longitudinal element for a display island moving means comprising;

A long angle iron section having vertical plate and horizontal plate and the horizontal plate is positioned parallel to a floor and supported a fraction of an inch above the floor by castered support means positioned near the ends of the angle iron and the support means is characterized by a horizontal support beam which is transverse to the long angle iron section and rigidly joined to the long angle iron section by means of an angle iron brace having a vertical plate and a horizontal plate and the vertical plate of the angle iron brace is secured to the vertical plate of the long angle iron section and the horizontal plate of the brace is secured to the support beam so that the support beam is positioned traversely over the long angle iron section and the ends of the support beam extend a short distance to either side of the long angle section and a caster rolling means is secured beneath each end of the support beam and the casters serve to support the horizontal plate of the long angle iron section a fraction of an inch above a floor and the horizontal plate of the long angle iron section is accessible from one side such that, for example, a load to be placed upon the horizontal plate need be raised less than one inch above the floor in order to permit the horizontal plate to be passed under the load and the vertical plate of the long angle iron section has an eyebolt secured to the plate near each end and projecting over the horizontal plate of the long angle iron and one eyebolt has secured thereto a lenght of non elastic joining means.

* * * * *